(12) United States Patent
Shoykhet et al.

(10) Patent No.: US 6,657,333 B2
(45) Date of Patent: Dec. 2, 2003

(54) VACUUM COUPLING OF ROTATING SUPERCONDUCTING ROTOR

(75) Inventors: Boris A. Shoykhet, Beachwood, OH (US); Burt Xudong Zhang, Twinsburg, OH (US); David Infante Driscoll, South Euclid, OH (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 30 days.

(21) Appl. No.: 09/954,246

(22) Filed: Sep. 17, 2001

(65) Prior Publication Data
US 2003/0052555 A1 Mar. 20, 2003

(51) Int. Cl.[7] .................................................. H02K 9/00
(52) U.S. Cl. .......................... 310/61; 310/60 A; 310/64
(58) Field of Search ........................... 310/52–61, 60 A, 310/60 R, 75 D; 285/904; 505/166, 878

(56) References Cited

U.S. PATENT DOCUMENTS

| | | | | |
|---|---|---|---|---|
| 3,823,569 A | * | 7/1974 | Sellmaier et al. | 62/50.7 |
| 3,845,639 A | * | 11/1974 | Smith et al. | 62/505 |
| 3,904,901 A | * | 9/1975 | Renard et al. | 310/52 |
| 4,289,986 A | * | 9/1981 | Kullmann | 310/61 |
| 4,448,042 A | * | 5/1984 | Yamaguchi et al. | 62/505 |
| 6,351,045 B1 | * | 2/2002 | Shoykhet | 310/52 |

* cited by examiner

*Primary Examiner*—Dang Le
(74) *Attorney, Agent, or Firm*—Quarles & Brady; Alexander M. Gerasimow; William R. Walbrun

(57) ABSTRACT

A rotating coupling allows a vacuum chamber in the rotor of a superconducting electric motor to be continually pumped out. The coupling consists of at least two concentric portions, one of which is allowed to rotate and the other of which is stationary. The coupling is located on the non-drive end of the rotor and is connected to a coolant supply and a vacuum pump. The coupling is smaller in diameter than the shaft of the rotor so that the shaft can be increased in diameter without having to increase the size of the vacuum seal.

20 Claims, 2 Drawing Sheets

VACUUM COUPLING OF ROTATING SUPERCONDUCTING ROTOR

STATEMENT REGARDING FEDERALLY SPONSORED RESEARCH OR DEVELOPMENT

This invention was made with Government support under Prime Contract No. DE-FC36-93CH10580 awarded by the Department of Energy. The Government has certain rights in this invention.

BACKGROUND OF THE INVENTION

The field of the invention is superconducting electric motors, specifically those that require that the superconducting material of the rotor be cooled, requiring the use of a cryogenic coolant supply system and a vacuum chamber.

Superconducting motors provide increases in power and efficiency over motors of a conventional, non-superconducting design. However, the use of superconducting materials presents obstacles that increase the complexity of the motor. The most significant impediment to the use of superconducting materials is temperature.

The current state of the art in superconductor motor technology is the use of what are referred to as high temperature superconductors (HTS) in the rotor of an electric motor. Despite their nomenclature, high temperature superconductors require an operating temperature in the range of 30K to 70K. This requires the use of a coolant system to deliver a low temperature coolant, such as liquid neon or gaseous helium, to the superconducting material. It also requires that the superconducting material be enclosed in a vacuum chamber to provide thermal insulation.

The fact that the superconducting material is contained in the rotor, which must be allowed to rotate, poses a significant problem for the creation and maintenance of a vacuum chamber. One way to obtain a vacuum in the rotor is to manufacture it as a sealed vacuum chamber. This approach does not require that the rotor be connected to an external vacuum pump during operation. However, it does require that the welds and joints be of a very high quality. In addition, the composite materials commonly used in high temperature superconductors have inherently high outgassing rates that rapidly compromise the vacuum level. This requires that the motor be stopped and the rotor vacuum chamber be pumped out periodically to maintain a sufficient level of vacuum.

The second way to obtain a vacuum surrounding the superconducting material is to enclose the entire rotor (and sometimes the stator) in a stationary vacuum chamber. This allows that vacuum space to be constantly pumped by an external vacuum pump to maintain the requisite level of vacuum. The major disadvantage to this approach is that it requires rotating vacuum seals for the rotor shaft. The cost and complexity of rotating vacuum seals increases as the size of the shaft increases. Therefore, for very large motors, the use of rotating vacuum seals becomes prohibitively expensive.

BRIEF SUMMARY OF THE INVENTION

The present invention overcomes the cost and complexity associated with creating and maintaining a vacuum insulation about the superconducting rotor coils in electric motors with large rotor shafts by continually pumping out the vacuum space through a rotating vacuum seal that is smaller in diameter than the rotor shaft. By using seals that are much smaller than the size of the shaft support bearings, and that do not have to support high radial loads, seal life is improved, seal cost is reduced, and leakage is reduced. The vacuum chamber is attached to the rotor to rotate therewith. Because the diameter of the coupling is not dependent on the diameter of the rotor shaft, the shaft can be made as large as desired without incurring the cost and complexity of large vacuum couplings.

Specifically, then, the present invention provides a rotor for use with a superconducting electric motor. The rotor includes a rotor support shaft having an outer surface having a first diameter for receiving a support bearing and having an inner axial bore and a vacuum seal with an interface dividing stationary and rotating portion of the vacuum seal, the interface having a second diameter smaller than the first diameter. A superconducting rotor winding communicates with the rotor support shaft to rotate therewith and a vacuum jacket is attached to the rotor support shaft to surround the superconducting rotor winding thereby providing thermal insulation. The inner bore of the rotor support shaft communicates with an interior of the vacuum jacket and a non-rotating vacuum line communicates with the inner bore so as to provide a path of evacuation of the interior of the vacuum jacket through the inner bore into the vacuum line. The vacuum seal fits between the vacuum line and the inner bore with one of the stationary and rotating portions of the vacuum seal fitting against the vacuum line and one of the stationary and rotating portions of the vacuum seal fitting against the inner bore.

Thus it is one object of the invention to provide a means for continuously evacuating a running motor. The use of a vacuum seal with a smaller diameter than the motor shaft makes a continuous coupling between the rotor and an external vacuum pump more robust and less expensive.

The vacuum seal may fit against the inner surface of the inner bore and an inner periphery of the vacuum seal fits against an outer periphery of the vacuum line.

Thus it is another object of the invention to provide a coupling that fits unobtrusively within one motor shaft.

The inner bore may include a concentric partitioning tube having a central lumen leading to the superconducting rotor windings and the vacuum line may include an inner concentric cryogen supply line positioned so that when the vacuum line communicates with the inner bore, the cryogen supply line engages the central lumen of the partitioning tube and the vacuum line communicates with the space between the partitioning tube and the inner bore.

Thus it is another object of the invention to provide a continuous cryogen supply to a rotating rotor.

The cryogen supply tube overlaps with the partitioning tube to minimize conduction between the vacuum seal and the cryogen of the cryogen supply line. Both the vacuum line and the inner concentric cryogen supply line extend beyond the second seal and are joined at their edges to provide an extended thermal path between the cryogenic temperatures of the cryogen supply line and the second seal.

Thus it is another object of the invention to permit the use of vacuum seals that cannot function at cryogenic temperatures.

The foregoing and other objects and advantages of the invention will appear from the following description. In the description, reference is made to the accompanying drawings that form a part hereof, and in which there is shown by way of illustration, a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 1:
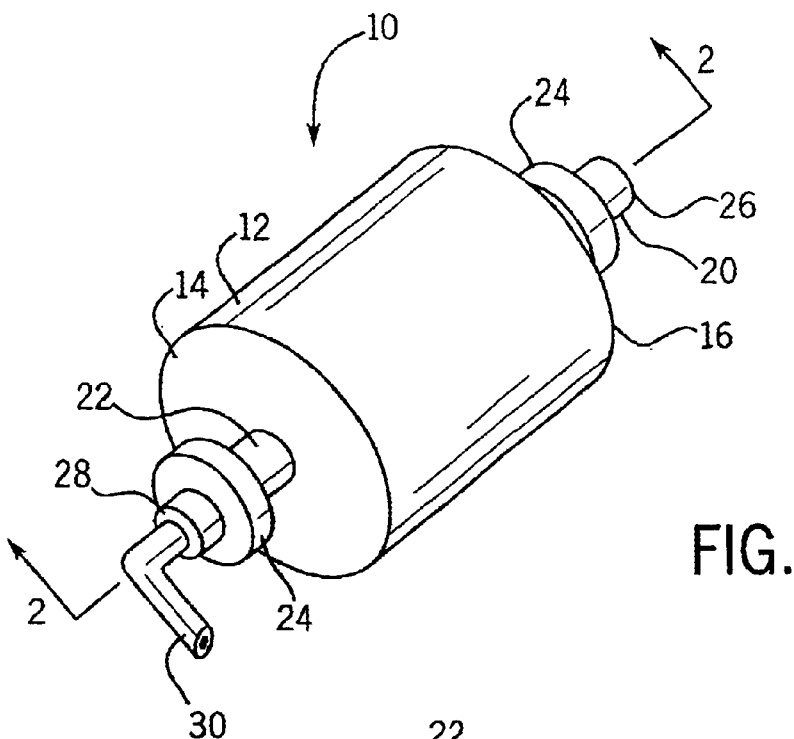
FIG. 1 is a perspective side view of the rotor and shaft assembly of the present invention showing the position of the rotating coupling and its size relative to the size of the rotor and rotor shaft and support bearings.

Referring now to FIG. 1, the present invention provides a superconducting rotor 10 for an electric motor. The rotor 10 includes a generally cylindrical vacuum jacket 12 having closed bases 14 and 16. Axial drive shaft 20 extends from base 16, and axial support shaft 22 extends from base 14. The shafts 22 and 20 are aligned with the central axis of the cylindrical vacuum jacket 12. The drive shaft 20 may be solid for increased torque and flexibility in coupling.

Figure 3:
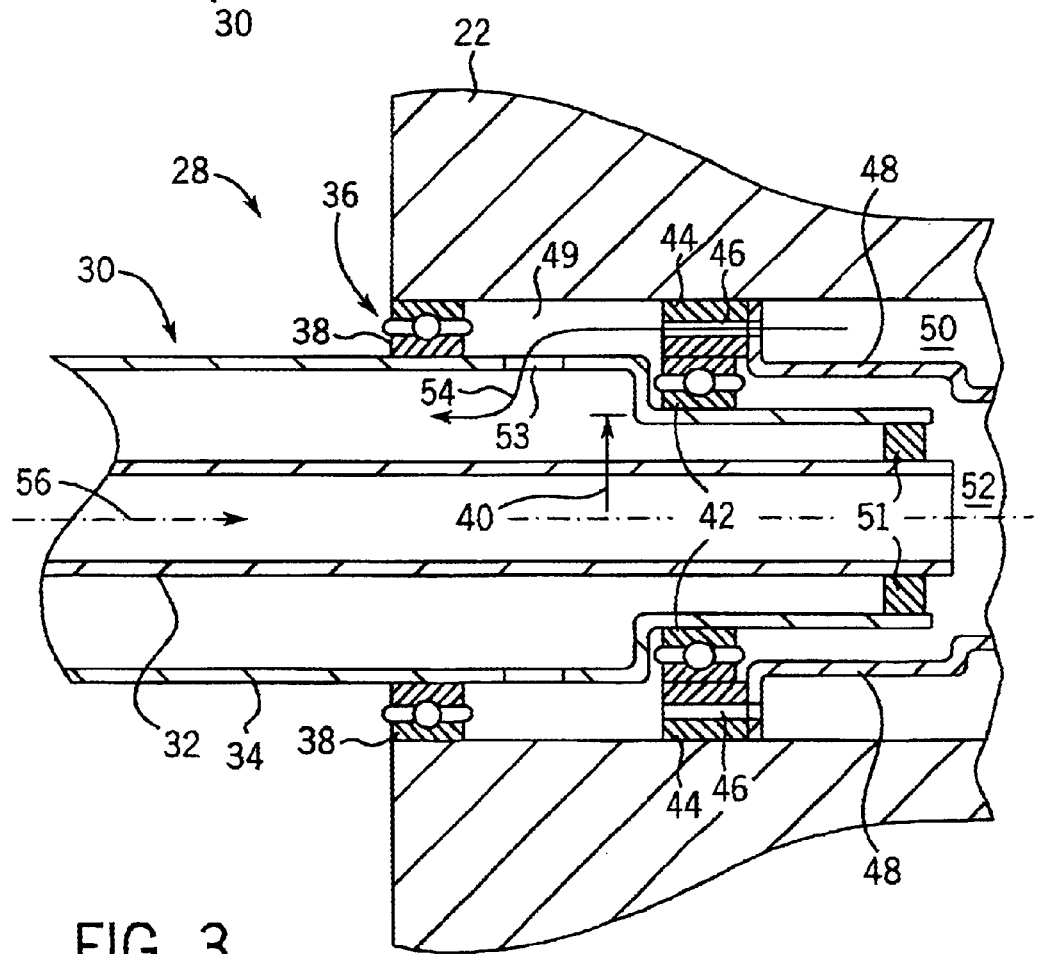
FIG. 3 is a detailed view of FIG. 2 showing the dual cryogen and vacuum pathways provided by the present invention.
Figure 2:
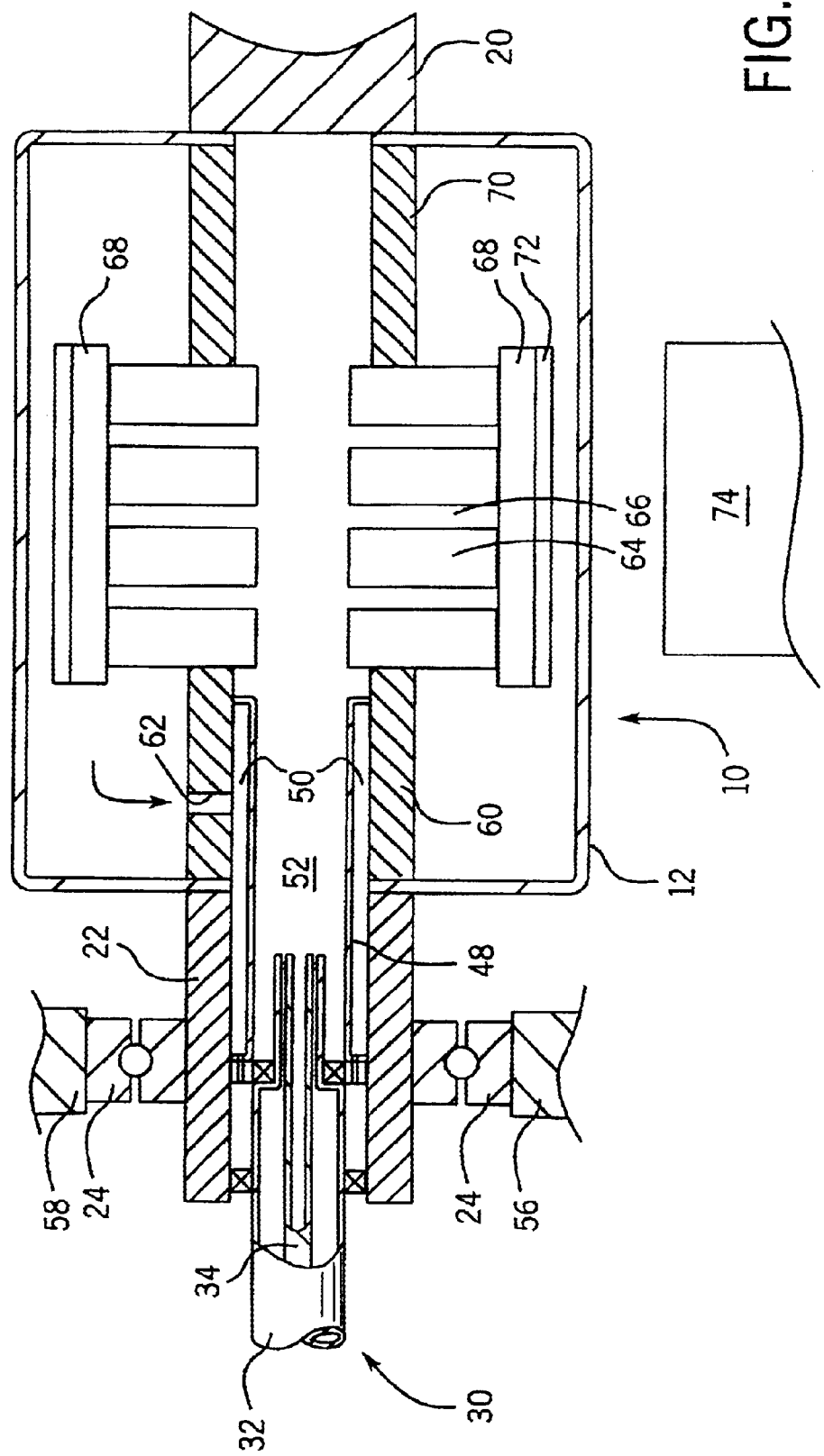
FIG. 2 is a cross-sectional view along lines 2—2 of FIG. 1 of the rotor and shaft showing the concentric cryogen supply line and vacuum line interfitting with seals within a bore of one rotor shaft.

Drive shaft 20 and support shaft 22 may be supported by conventional ball bearings 24 in a manner well known in the art and extend through the ball bearings 24 to provide outer end 26 of drive shaft 20, that may be coupled to a machine receiving torque from the rotor 10 and to provide outer end 28, of support shaft 22, that may receive a combined cryogen/vacuum line 30. Referring now to FIGS. 2 and 3, the combined cryogen/vacuum line 30 provides a cryogen pipe 32 concentrically located within a larger vacuum pipe 34. Referring now principally to FIG. 2, the bearings 24 in turn may be supported by a housing 58 of a type well known in the art containing the armature and other features of the motor.

Continuing to refer to FIGS. 2 and 3, the support shaft 22 includes an axial bore 36 and fitted within the axial bore 36 at the end 28 is a ferrofluidic seal and bearing 38 abutting at its outer periphery the inner surface of the bore 36 and supporting at its inner periphery the outer surface of the combined cryogen/vacuum line 30. As is well understood in the art, the ferrofluidic seal and bearing provides both a conventional radial ball bearing and by means of a ferrofluidic liquid, a vacuum seal between the sliding surfaces which define an interface between the moving a stationary portions of the ferrofluidic seal and bearing 38. The interface is of a significantly smaller diameter than the diameter of the support shaft 22. Such ferrofluidic seal and bearings are well known in the art and may be obtained from a number of commercial manufacturers including Ferrofluidics Corporation of New Hampshire.

After passage into the bore 36 and past the ferrofluidic seal and bearing 38, the vacuum pipe 34 necks inward to a reduced diameter 40 to fit within a second ferrofluidic seal and bearing 42 having an inner periphery of smaller diameter than the inner periphery of ferrofluidic seal and bearing 38. The second ferrofluidic seal and bearing 42 supports the outer surface of the necked portion of the vacuum pipe 34. The outer periphery of the second ferrofluidic seal and bearing 42 fits within a spacer ring 44 spanning the distance between the outer periphery of the second ferrofluidic seal and bearing 42 and the inner surface of the bore 36 and forming part of a stationary portion of the second ferrofluidic seal and bearing 42. The ring 44 is fixed to the support shaft 22 to rotate therewith.

Attached to the inner radial face of ring 44 (removed from the outer end 28 of the support shaft 22) is a radially outwardly flared lip of a partition tube 48 fitted coaxially within bore 36. The partition tube 48 loosely surrounds the necked down portion of the vacuum pipe 34 and cryogen pipe 32 and extends through the vacuum jacket 12 into its inner volume.

Ring 44 includes a plurality of axial ports 46 aligning with an axial bore in the flared lip of partition tube 48 to provide communication between a space 49 defined within the ferrofluidic seal and bearing 38, the ring 44, the bore 36 of the support shaft 22 and outer surface of the vacuum pipe 34, and a space 50 defined within the bore 36 of the support shaft 22 and the outer surface of the partition tube 48. A port 53 cut in the outer surface of the vacuum pipe 34 provides a path 54 for drawing air from space 50, through the ring 44 to space 49 and then into the vacuum pipe 34 which is connected externally to a vacuum pump (not shown).

Cryogen may pass along path 56 within the inner cryogen pipe 32 to a volume 52 inside the wall of the partition tube 48. The vacuum pipe 34 and cryogen pipe 32 extend an arbitrary distance past the ferrofluidic seal and bearing 42 so as to provide a high thermal resistance between the cryogen and the ferrofluidic seal and bearing 42 and are joined together by stopper ring 51 which connects the outer surface of the inner cryogen pipe 32 to the inner surface of the vacuum pipe 34. It will be understood that the cryogen pipe 32 will thus be more thermally isolated from the support shaft 22 as is connected by the ferrofluidic seal and bearing 42 and ring 44 by a relatively thin cross-section of an appropriately long thermal path. The loose fit between the vacuum pipe 34 within the partition tube 48 provides a gas passage from the end of vacuum pipe 34 and cryogen pipe 32 back to the ferrofluidic seal and bearing 42 but this is a relatively narrow cross section and dead-ended so there is little thermal conduction through gas trapped therein.

Referring now principally to FIG. 2, the support shaft 22 abuts the vacuum jacket 12 of the rotor 10 to sandwich a base of the vacuum jacket 12 between itself and a composite torque tube 60 axially aligned with the support shaft 22 inside the vacuum jacket 12. The torque tube 60 provides a continuation of the support function of the support shaft 22, however, with lower thermal conductivity provided both by material selection and its being hollow. The partition tube 48 extends from the bore 36 of the support shaft 22 into the torque tube 60 and then by means of a second outwardly flared lip expands radially to attach to the inner surface of the torque tube assembly 60. An orifice 62 cut in the torque tube 60 to communication between space 50 and the interior of the vacuum jacket 12 so that the latter may be evacuated through vacuum pipe 34.

The torque tube assembly 60 connects also to a coil support 64 which includes an internal cryogen distribution structure 66 allowing cryogen in volume 52 to pass through the cryogen distribution structure 66 to high temperature superconducting field windings 68 attached at the outer periphery of the support structure 64. An AC flux shield 72 may be positioned outside of the high temperature superconductor windings 68 between the high temperature superconductor windings 68 and the armature 74.

The cryogen introduced into volume 52 may thus communicate with an inner surface of the high temperature superconducting winding 68 without release to the general inner volume of the vacuum jacket 12 surrounding the high temperature superconducting windings 68. In this manner, both vacuum and cryogen may be separately contained with the rotor 10.

Axially, on the opposite side of the support structure 64 from the torque tube 60, a similar torque tube 70 connects to the base 16 of the vacuum jacket 12 which is sandwiched between torque tube 70 and drive shaft 20 as described with respect to FIG. 1.

Importantly, it will be noted that the size of the ferrofluidic seal and bearings 38 and 42 is substantially smaller than the size of the bearing 24 thus reducing the potential leakage area significantly decreasing the cost of the seals which also are not required to support any substantial radial loads which are handled by the bearing 24. In this embodiment, vacuum vessel rotates with the shaft thus eliminating any further seal that would be required between the vacuum vessel and the shaft.

The rotor 10 thus formed may be surrounded by armature 74 of conventional design having standard conductors which are thus isolated from the high temperature superconductor windings 68 which are within the vacuum jacket 12. An exciter of conventional design (not shown) may be fit either to the drive shaft 20 or to the support shaft 22.

During operation, a vacuum pump is attached to the vacuum line and cryogen is inserted into the cryogen pipe 32 without the need for complex couplings and both lines are nonrotating.

It is specifically intended that the present invention not be limited to the embodiments and illustrations contained herein, but that modified forms of those embodiments including portions of the embodiments and combinations of elements of different embodiments also be included as come within the scope of the following claims.

What is claimed is:

1. A rotor for use with a superconducting electric motor comprising:
    a rotor support shaft having an outer surface having a first diameter for receiving a support bearing and having an inner axial bore;
    a vacuum seal having an interface dividing stationary and rotating portion of the vacuum seal, the interface having a second diameter smaller than the first diameter;
    a superconducting rotor winding communicating with the rotor support shaft to rotate therewith
    a vacuum jacket attached to the rotor support shaft to surround the superconducting rotor winding thereby providing thermal insulation, wherein the inner bore of the rotor support shaft communicates with an interior of the vacuum jacket; and
    a non-rotating vacuum line communicating with the inner bore so as to provide a path of evacuation of the interior of the vacuum jacket through the inner bore into the vacuum line wherein the vacuum seal fits between the vacuum line and the inner bore with one of the stationary and rotating portions of the vacuum seal fitting against the vacuum line and one of the stationary and rotating portions of the vacuum seal fitting against the inner bore.

2. The rotor of claim 1 wherein an outer periphery of the vacuum seal fits against the inner surface of the inner bore and an inner periphery of the vacuum seal fits against an outer periphery of the vacuum line.

3. The rotor of claim 2 wherein the inner bore includes a concentric partitioning tube having a central lumen leading to the superconducting rotor windings and wherein the vacuum line includes an inner concentric cryogen supply line positioned so that when the vacuum Line communicates with the inner bore, the cryogen supply line engages the central lumen of the partitioning tube and the vacuum line communicates with the space between the partitioning tube and the inner bore.

4. The rotor of claim 3 wherein the cryogen supply tube overlaps with the partitioning tube to minimize conduction between the vacuum seal and the cryogen of the cryogen supply line.

5. The rotor of claim 3 wherein including a second vacuum seal positioned further along the inner bore from the first vacuum seal and wherein an outer stationary portion of the seal includes an aperture communicating with a space between the inner bore and the partitioning tube and wherein the vacuum line includes an aperture along its length between the first and second vacuum seals.

6. The rotor of claim 5 wherein both the vacuum line and the inner concentric cryogen supply line extend beyond the second seal and are joined at their edges to provide an extended thermal path between the cryogenic temperatures of the cryogen supply line and the second seal.

7. The rotor of claim 3 wherein including a cryogen distribution structure communicating with the central lumen of the partitioning tube is sealed against communication with the evacuated volume of the vacuum jacket.

8. An electric motor comprising:
    a) a suitor connected to an external current source to generate a driving magnetic field;
    b) a rotor providing a housing enclosing a superconducting circuit within a rotor volume, the rotor further having at least a first shaft for transmitting torque to an external device, the rotor being mounted for rotation about an axis aligned with the shaft;
    c) a rotating coupling providing a hermetic conduit between the rotor volume and a stationary tube exterior to the motor, wherein the coupling includes a bearing to enable relative rotation between the rotor volume and the stationary tube.

9. The motor as recited in claim 8, where the rotor volume further encloses a cryogen distribution structure.

10. The motor as recited in claim 8, where a second shaft opposes the first shaft and wherein the rotating coupling is located on an end of the first rotor shaft.

11. The motor as recited in claim 8, where the rotating coupling includes a stationary portion having an inner periphery and attached to a rotating portion having an outer periphery coaxial with the inner periphery, the stationary portion and rotating portion meeting at an annular interface having a first diameter with respect to the bore axes, where the first diameter is less than a diameter of the first shaft of the rotor.

12. The motor as recited in claim 11, where the annular interface between the stationary portion and the rotating portion of the rotor is charged with a ferrofluid.

13. The motor as recited in claim 11, where the rotating coupling is coaxial with the first shaft of the rotor.

14. The motor as recited in claim 11, where a stationary tube is attached to the inner periphery of the rotating coupling to provide a sealed path from the rotating coupling to the exterior of the motor.

15. The motor as recited in claim 14, where a second stationary tube having a smaller diameter than, and coaxial with, the first stationary tube extends from the interior of the scaled rotor volume through the rotating coupling to the exterior of the motor to provide a fluid path to the superconducting circuit.

16. An electric motor comprising:
    a) a stator connected to an external current source to generate a driving magnetic field;
    b) a rotor providing a housing enclosing a superconducting circuit within a rotor volume, the rotor further having at least a first shaft for transmitting torque to an external device, the rotor being mounted for rotation about an axis aligned with the shaft;
    c) a rotating coupling providing a hermetic conduit between the rotor volume and a stationary tube exterior to the motor;
    wherein the rotating coupling includes a stationary portion having an inner periphery and attached to a rotating portion having an outer periphery coaxial with the inner periphery, the stationary portion and rotating portion meeting at an annular interface having a first diameter with respect to the bore axis, where the first diameter is less than a diameter of the first shaft of the rotor.

17. The motor as recited in claim 16, where the annular interface between the stationary portion and the rotating portion of the rotor is charged with a ferrofluid.

18. The motor as recited in claim 16, where the rotating coupling is coaxial with the first shaft of the rotor.

19. The motor as recited in claim 16, where a stationary tube is attached to the inner periphery of the rotating coupling to provide a sealed path from the rotating coupling to the exterior of the motor.

20. The motor as recited in claim 19, where a second stationary tube having a smaller diameter than, and coaxial with, the first stationary tube extends from the interior of the sealed rotor volume through the rotating coupling to the exterior of the motor to provide a fluid path to the superconducting circuit.

* * * * *